June 17, 1941. W. P. POWERS 2,246,002
INDICATING AND LIKE INSTRUMENT
Filed Aug. 20, 1940 3 Sheets-Sheet 2
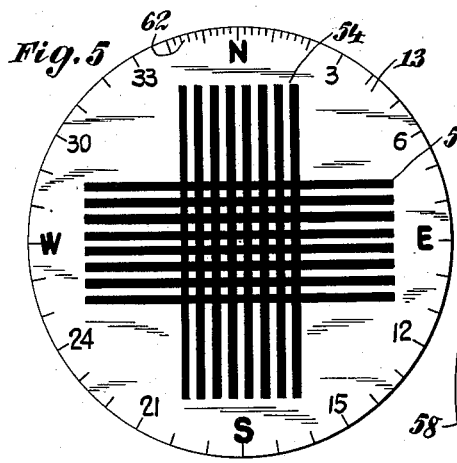
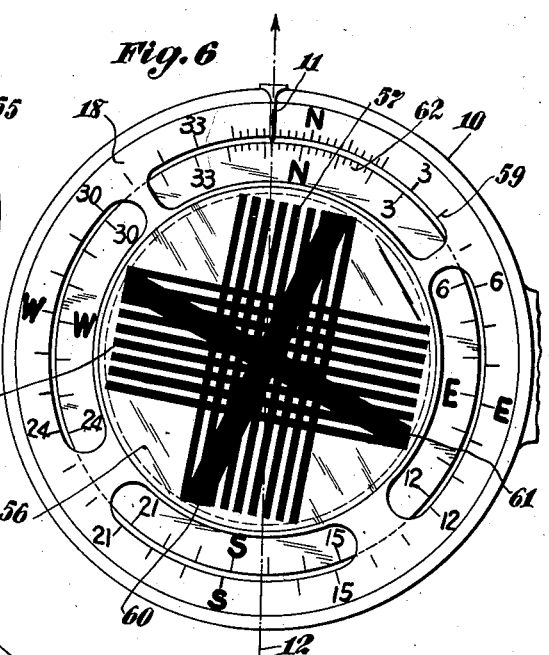
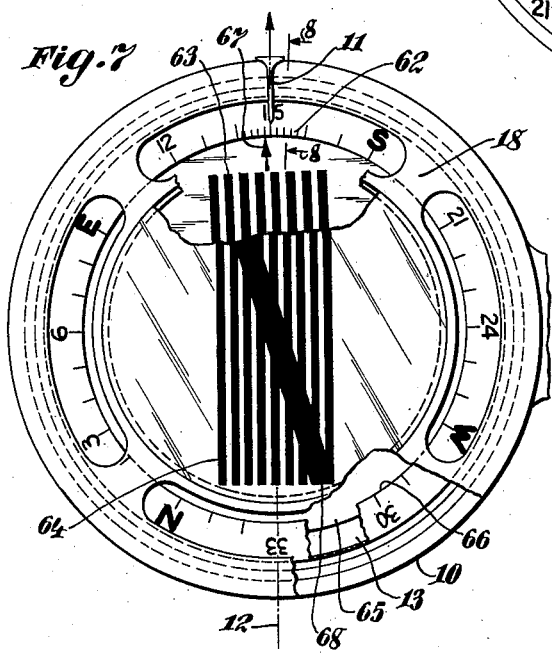
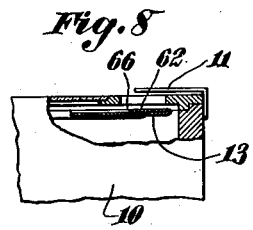
Walter P. Powers,
INVENTOR.
BY
ATTORNEY.

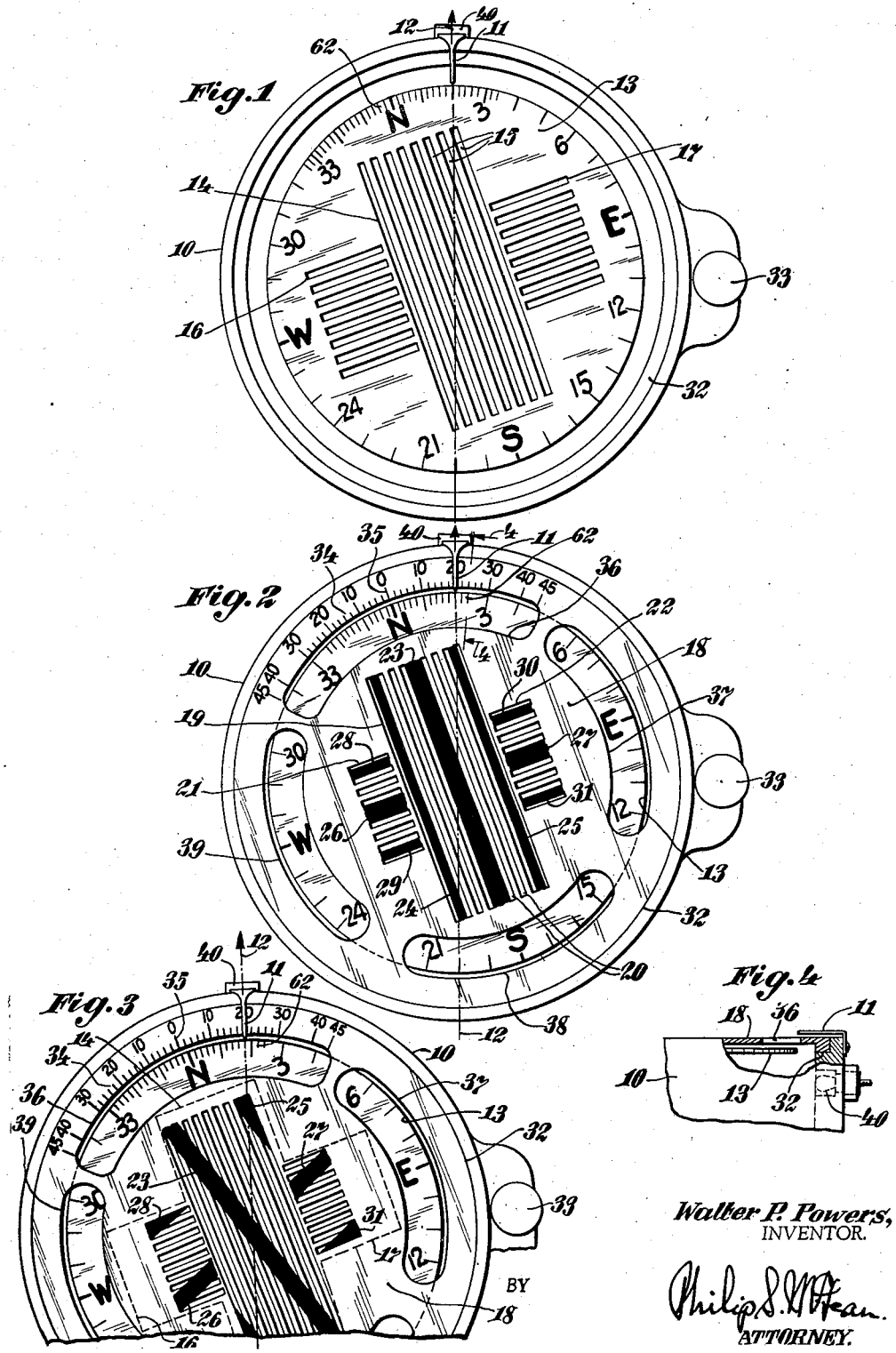

June 17, 1941.  W. P. POWERS  2,246,002
INDICATING AND LIKE INSTRUMENT
Filed Aug. 20, 1940  3 Sheets-Sheet 3
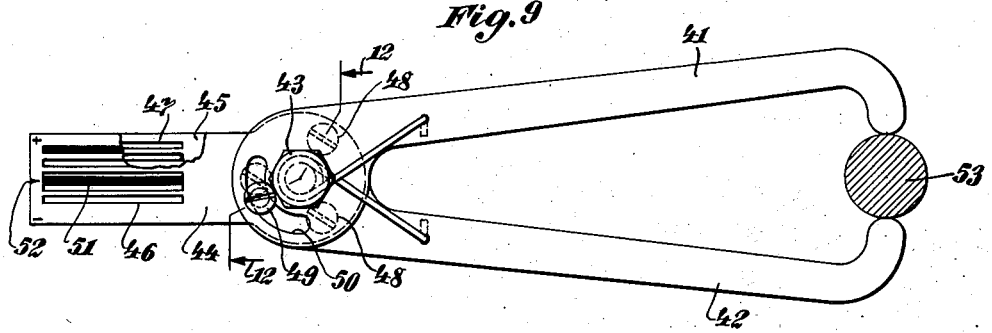
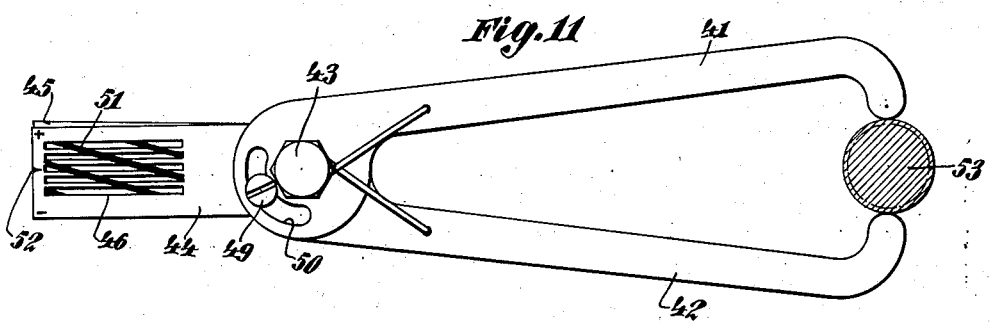
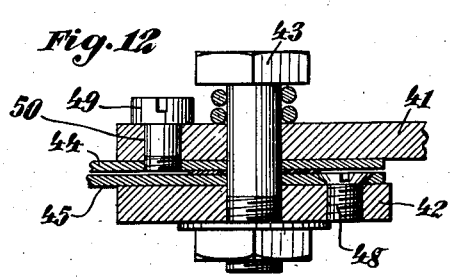
Walter P. Powers,
INVENTOR.
BY
ATTORNE Patented June 17, 1941

2,246,002

UNITED STATES PATENT OFFICE 2,246,002

INDICATING AND LIKE INSTRUMENT

Walter P. Powers, East Orange, N. J., assignor to Associated Patentees, Inc., a corporation of New Jersey Application August 20, 1940, Serial No. 353,373

20 Claims. (Cl. 33—149)

The invention herein disclosed relates to indicating instruments, particularly such as compasses, course indicators, turn and bank indicators, artificial horizons, fire control and various forms of measuring instruments, such as calipers, gages and the like.

Objects of the invention are to provide an easily read form of indicator which will show at a glance relatively fine deviations and the direction of such deviations from a given standard or value.

Special objects are to provide such a sensitive, easily read indicator which will be of simple sturdy design and readily applicable to existing requirements and conditions.

The foregoing and other desirable objects are attained in the present invention by novel features of construction, combination and relation of parts as hereinafter described, illustrated in the accompanying drawings and broadly covered in the claims.

In said drawings Figures 1, 2 and 3 are views illustrating embodiment of the invention in a compass, Figure 1 being a plan view of the instrument case and the compass card mounted for directional movement therein; Figure 2 being a similar view showing the adjustable cover which forms the course indicator in position and with the indicator pointer showing the craft "on-course"; and Figure 3 being a broken plan view with the pointer showing a quite appreciable deviation for an actually relatively small off course altitude.

Figure 4 is a broken sectional detail as on line 4—4 of Figure 2.

Figures 5 and 6 illustrate a modified form of compass structure, Figure 5 being a plan view of the movable compass card and Figure 6 being a broken plan of the assembled instrument, showing an off-course indication.

Figure 7 is a broken plan and part sectional view of another compass embodiment; and Figure 8 is a broken sectional detail as on line 8—8 of Figure 7.

Figure 9 is a side elevation of the invention as embodied in a form of indicating calipers, the stock being measured appearing in section and the indicator showing such stock as correct size.

Figure 10 is a broken plan view of the instrument.

Figure 11 is a view similar to Figure 9 with the indicator showing that the stock is too large.

Figure 12 is a broken sectional detail as on line 12—12 of Figure 9.

In Figure 1 a compass case 10 is shown having a "lubber-line" or pointer 11 and mounted on the axis 12 representing the "heading" of the craft on which the instrument is used.

The rotatable element of the compass is indicated as a pivotally mounted compass card 13, magnetically or gyroscopically controlled and shown as carrying the complete compass scale 62. This may be considered as a master or a repeater compass and as mounted horizontally, vertically or in other desired relation.

The movable card or indicator element of the compass is shown as carrying a grid 14 formed of parallel lines or bars. With an internally lighted instrument, these bars or lines may be created by providing a series of parallel slots 15 across the center of the card, lined up with the N and S markings.

Secondary grid lines are provided in the illustration by parallel slots 16, 17 in the card at opposite sides of and at right angles to the first grid slots, in line with the E—W indications.

To provide the desired quick on and off-course indications, a cover 18 is located over the compass card, carrying a grid 19 of parallel lines or bars, slightly different in pitch or spacing from the bars of the lower movable grid 14. The upper or top grid may be formed in the same way as by parallel slots 20 in the cover plate.

In this particular disclosure secondary grids 21, 22 of slightly different pitch are carried by the cover over the secondary or side grids 16, 17 of the movable card.

The difference in spacing of the grids on the card and cover provides a vernier effect, which when the bars of the two grids are in alinement, creates a heavier shadow or shadows which will swing quickly to one side or the other with very slight changes in misalinement.

With the two grids in lineal registration as in Figure 2 the effect is created of a heavy black pointer 23 at the center and two narrower pointers 24, 25 at the sides, extending the full length of the grid and hence, if desired, a distance practically equal to the full diameter of the compass card.

With side grids, as in the illustration, there will be heavy center transverse shadow pointers 26, 27 and narrower side shadow pointers 28, 29 and 30, 31, when the movable and stationary grids are in registration.

By mounting the cover for rotary adjustment it may be used as a course indicator or reference index. In the illustration the cover is shown as rotatably seated on the annular shoulder 32 in the top of the case and as adjusted through suitable gearing from a course setting knob 33.

In Figure 2 the course indicating cover is shown as set at 20°. With the craft on this course the compass card will hold at this same point and consequently the shadow bars or pointers will provide the "on-course" indication shown.

Figure 3 illustrates the effect of a heading approximately two degrees off-course to the left and in which case the main shadow pointer 23 is shown as having swung about the center clear across the width of the grid, a movement many times that of the actual compass deviation. In such case the short rectangularly related shadow pointers at opposite sides of the main pointer may swing substantially as indicated in this figure.

The compass card shows the true heading at all times. With the course indicator 18 set to the desired heading the instrument will show at a glance whether the craft is on-course, as in Figure 2, or any slight deviation from course, as in Figure 3. The shifting of the bars of shadow is so rapid that any off-course movement is immediately detected even by casual glance. With a greater number of lines or bars in the front or top grid than in the back grid, the indicating pointer will swing in the direction of off-course movement; but if a reverse effect is desired, it may be obtained by having the grid of lesser number of bars in the same space, at the front.

Constructed as illustrated with a main N and S grid extending nearly the full diameter of the compass card and short grids at opposite sides and forming in effect a discontinuous E—W grid interrupted at the center, the northerly and southerly headings will be followed using the full length pointers 23, 24, 25 and the easterly and westerly headings can be followed using the interrupted pointers 26, 27 and 28—30 and 29—31. If desired, however, the N—S and E—W grids may cross each other at the center. Such grids may be formed by applying a black coating on a transparent supporting medium and then removing such coating in two sets of parallel lines crossing at right angles.

The provision of two rectangularly related grids enables the instrument to be read with the pointer showing turn to one side or the other and renders a less than 90° adjustment of the course indicator sufficient for all purposes.

In the illustration the course indicator is shown as having a scale 34 of approximately 45° to each side of a center index point 35 and as having an arcuate window 36 beneath the scale of approximately the same angular extent through which the markings on the compass card will appear. In the particular position of parts shown in Figure 2 the course indicator is set for a heading of 20°. If the desired heading were 340°, for example, the course indicator would be set with the 20 at the left of the index 35 on the lubber-line 11. For 45°, or for 315°, the corresponding position at the opposite side, the course indicator may be set with the 45° mark at either end of the scale on the lubber-line. For a South heading, 180°, the course indicator would be set with the index 35 on the lubber-line, just as for a north setting, but with a correct heading the S of the compass card would appear through the window 36, on the lubber-line, and the shadow pointers 23 and 26, etc., would be lined up as in Figure 2, providing on-course indication. For a heading to the east of south, the course indicator would be set the proper number of degrees to the right and for west of south a proper number of degrees to the left of the lubber-line. Thus, adjustments for any heading can be accomplished by simply setting the course indicator within the range of the 90° scale 34 illustrated.

Other windows 37, 38 and 39 are shown provided in the cover plate so that other compass points can be seen at all times.

If desired, the window 36 may be extended entirely around the cover and with such construction it may be considered desirable to adjust the course indicator through the entire 360°, and in which event the scale (34) on the course indicator may run from zero to 360° and correspond exactly to the scale on the compass card. Then, with correct heading, the two scales would exactly correspond, the lubber-line would show the course in degrees on the compass scale and the shadow pointers would line up as in Figure 2, the whole providing highly desirable quick reading and checking indication.

Any usual or special illumination may be provided, a more or less conventional form of illumination being indicated in Figure 4 where a small lamp is shown at 40, set into the side of the case for illuminating the slotted form of compass card from the back.

Figure 5 illustrates a form of movable compass card carrying angularly related grids 54, 55 made up of lines ruled or printed on the card and actually crossing each other, substantially at right angles.

Figure 6 shows the complete instrument. In this case the top or cover 18 has a central transparent portion 56 carrying similarly crossed grids 57, 58 in vernier relation to the grids 54, 55 respectively.

In this particular form of the invention, Figure 6, the top or course indicator 18 is shown as having a 360° compass scale 59 which will match the compass rose of the reference member 13.

In the illustration the course indicator is set at 350°, the lubber-line 11 shows on the compass rose of the constant pointing reference element 13, an off-course heading of 2° to the right and the shadow pointer 60 produced by the two grids 54, 57, shows to an exaggerated extent, this off-course heading to the right. Similarly, the related grids 55, 58 show by the transversely extending shadow pointer 61 that the craft has twisted around off-course to the right. This transversely extending pointer may thus be read as representing the transverse axis of the craft and may be considered alone or in conjunction with the pointer 60 representing the longitudinal axis of the craft.

In the modification illustrated in Figures 7 and 8 the adjustment for course setting is accomplished by providing the full compass scale 62 on the constant pointing reference member 13 and by mounting the grid 63 on this member so that it may be pointed to any desired course on the scale, to register with the vernier grid 64 on the cover or top 18 of the instrument and which latter is lined up with the lubber-line 11.

The course setting adjustment of the lower, movable grid 63 is provided for in the particular construction shown by affixing that grid, as by printing or otherwise, on a circular card 65 rotatably adjustable on the face of the compass disc 13 and held so by an inwardly extending annular confining flange 69, Figure 8, at the rim of that disc.

The latter form of the invention has the advantage that the upper or outer grid 64 may remain fixed on the lubber-line and thus stand at all times on-course.

Special means may be provided for setting the lower or movable grid 63 on the compass element, the windows in the top of the instrument case may be open sufficiently to give access for this purpose or the top may be readily removable to permit turning of the grid card by hand on the directional element.

In the particular example illustrated in Figure 7, the grid card 65 has been rotated on the reference element 63 to carry the grid pointer 67 to 148° on the compass scale and the position of this scale in respect to the lubber-line shows that the craft is 2° off such course, to the right.

Also in the embodiment shown, the grid of the fewer number of lines is on top so that movement of the shadow pointer 68 will be the reverse of, instead of in the same direction as movement of the craft. This means that the pointer will point toward the destination; in other words, incline toward the true course, thus serving in effect as a direction finder, but actually showing this to an exaggerated extent. Thus in the case under consideration, the heading is only 2° off to the right but the shadow pointer, representing the course direction, indicates that the course is off to the left more than the 2° showing at the lubber-line. This amplification or exaggeration of the deviation is of assistance to the pilot to swing back quickly onto the course.

Since the invention requires no optical system of lenses, mirrors, etc., vibration does not affect accuracy of the instrument. As a consequence, the invention is particularly adapted for such uses as gun sights and the like. The invention may be applied to control as well as to indicating purposes, one example of which would be the control of a photoelectric cell by the shade line of the pointer and which photoelectric cell might be used for controlling apparatus of any sort.

In applying the invention to gages, calipers and the like, the construction may be on the order of that indicated in Figures 5 to 8. Here the arms 41, 42 of the calipers, pivotally connected at 43, carry the plates 44, 45 slotted to provide the parallel bar grids 46, 47. The two screens may be relatively adjustable to enable setting of the instrument to different sizes of work. In the illustration the screen 45—47 is fixedly secured as by screw 48, Figure 8, to one caliper arm, 42, and the other screen 44—46 is pivotally engaged on the bolt 43 and is held in different angularly adjustable positions by clamp screw 49 in arcuate slot 50 in the other caliper arm 41.

With proper setting of the instrument the screens or grids will register as in Figure 5, when the piece being measured is correct size, to show a shadow pointer 51 registering with an index 52 or the like.

If the work or piece 53 being measured is oversize, as represented in Figure 7, the grids will be out of registration to throw the shadow pointer 51 in one direction and if the piece is too small, this pointer will be thrown in the opposite direction.

In this latter construction, as in the first illustrated form of the invention, small variations will effect relatively large displacement of the large and easily read shadow pointer and as such pointer is an intangible element, that is, simply a heavy dark shade line or bar, there is no inertia or lag from pointer structure.

In the second form of the invention illustrated the grid of the fewer number of lines is placed at the front so that the indicator arrow will point upward with increase of diameter measured and downward with reduction of size measured. Also in this example the pivotal center is at one end instead of at a mid-point of the grids. Consequently, the shadow pointer swings from one end instead of about a point mid-length of the grids, as in the first example. Each method may have its own advantages for special instruments or indicating purposes. In all forms of the invention the shadow pointer may be read from directly in front or from a position at either side of the instrument, thus making one instrument readable in the same values by different observers. The two grids are unlike in the sense that in their superposed relation, as ordinarily observed, they will create the effect of the bar or pointer which, with slight movement of the parts, will swing through a relatively wide angle about the center of pivotal relation. This unlike character may be the result of the different spacing and width of the lines, as first described. This is usually the case where the relatively movable elements are closely related, as in constructions such as illustrated. With greater separation of the relatively movable parallel grids or screens the bars or lines may be of the same mesh, pitch or spacing, the angle of vision then of itself creating the desired partial obscuration of one by the other and hence the required shadow pointer effect. The superposed flat screens or grids of the invention, therefore, may be considered as unlike or in vernier relation to create this desired effect.

While illustrated as applied to a compass and to calipers, it will be realized from the foregoing that the invention is adapted as well to many other forms of instruments and tools. It should be realized also that the terms employed herein have been used in a descriptive rather than in a limiting sense, except where the intent to limit is plain or where possibly state of the art may require specific limitation.

What is claimed is:

1. An indicator of the character disclosed, comprising flat grids of spaced substantially parallel lines in vernier relation and superposed substantially parallel to create by partial obscuration a combined shadow line or bar and said grids being pivotally related on an axis substantially at right angles to said grids to cause said shadow indication to swing through a wide angle about the pivotal center and angularly across the substantially parallel lines of the grids with relatively small actual relative movement of the grids.

2. An indicator of the character disclosed, comprising grids of spaced substantially parallel lines in vernier relation, said grids being superposed to form a combined shadow line extending the full length of the grids and said grids being pivotally related at a center part-length of the grids and on an axis substantially at right angles to said grids to cause said shadow line to rotate about said center and into variously inclined relations across the substantially parallel lines of said grids upon relative pivotal movement of the grids on said center.

3. An indicator of the character disclosed, comprising grids of spaced substantially parallel lines in vernier relation, said grids being superposed to form a combined shadow line extending the full length of the grids and said grids being pivotally related at a center at one end of the two grids and on an axis substantially at right angles to said grids to cause said shadow line to swing from said center at one end across the width of the grids at the opposite end upon relative movement of the grids about said center.

4. An indicator of the character disclosed, comprising overlying relatively movable grids of spaced substantially parallel lines in vernier relation and secondary grids of spaced substantially parallel lines in vernier relation angularly related to said first grids and in the same relatively movable relation.

5. An indicator of the character disclosed, comprising overlying relatively movable grids of spaced substantially parallel lines in vernier relation, secondary grids of spaced substantially parallel lines in vernier relation angularly related to said first grids and in the same relatively movable relation, a movable compass card mounting one pair of angularly related grids and a relatively stationary indicator element associated with said compass card and mounting the other pair of angularly related grids.

6. An indicator of the character disclosed, comprising overlying relatively movable grids of spaced substantially parallel lines in vernier relation, secondary grids of spaced substantially parallel lines in vernier relation angularly related to said first grids and in the same relatively movable relation, a movable compass card mounting one pair of angularly related grids, a relatively stationary indicator element associated with said compass card and mounting the other pair of angularly related grids, a common support for said compass card and indicator element and means for enabling the adjustment of said indicator element on said common support for course setting purposes.

7. An indicator of the character disclosed, comprising flat grids of spaced substantially parallel lines in vernier relation and superposed to create by partial obscuration a combined shadow line or bar and said grids being pivotally related to cause said shadow indication to swing through a wide angle about the pivotal center with relatively small actual relative movement of the grids, a rotatably mounted compass element carrying one of said grids and a relatively stationary element supporting the other of said grids, said supporting element being mounted for adjustment for course setting purposes.

8. An indicator of the character disclosed, comprising flat grids of spaced substantially parallel lines in vernier relation and superposed to create by partial obscuration a combined shadow line or bar and said grids being pivotally related to cause said shadow indication to swing through a wide angle about the pivotal center with relatively small actual relative movement of the grids, a compass case, a compass card pivoted in said case and carrying one of said grids and a cover rotatably adjustable on said case and carrying the other of said grids.

9. A compass comprising a case having a lubber-line, a rotatably adjustable cover having a scale registering with said lubber-line, a compass card rotatably operable in said case in association with said lubber-line and grids of spaced substantially parallel lines in vernier relation carried by said adjustable cover and pivotally mounted compass card respectively.

10. An indicator of the character disclosed, comprising flat grids of spaced substantially parallel lines in vernier relation and superposed to create by partial obscuration a combined shadow line or bar and said grids being pivotally related to cause said shadow indication to swing through a wide angle about the pivotal center with relatively small actual relative movement of the grids, one of said grids being mounted for free pivotal movement and the associated grid being mounted for variable angular adjustment about the center of said pivotal mounting.

11. In combination with calipering means including pivotally connected measuring arms, superposed grids of spaced substantially parallel lines in vernier relation carried by said measuring arms.

12. In combination with calipering means including pivotally connected measuring arms, superposed grids of spaced substantially parallel lines in vernier relation carried by said measuring arms, one of said grids being connected with one of said measuring arms in angularly adjustable relation with respect to the pivotal connection between the measuring arms.

13. An indicator of the character disclosed, comprising overlying relatively movable grids of spaced substantially parallel lines in vernier relation and a second set of overlying relatively movable grids of spaced substantially parallel lines in vernier relation angularly related to said first set of grids and operable in the same relatively movable relation.

14. An indicator of the character disclosed, comprising overlying relatively movable grids of spaced substantially parallel lines in vernier relation and a second set of overlying relatively movable grids of spaced substantially parallel lines in vernier relation angularly related to said first set of grids and operable in the same relatively movable relation, the grids of one set being carried respectively by relatively movable supports and the grids of said second set being respectively carried by said same relatively movable supports.

15. An indicator of the character disclosed, comprising a grid of spaced substantially parallel lines, a second grid of spaced substantially parallel lines angularly related to and crossing the lines of said first grid, a member supporting said angularly related grids, a second supporting member, a grid of spaced substantially parallel lines carried by said second support and optically related to said first mentioned angularly associated grids and means for enabling relative angular motion of said two supporting members.

16. An indicator of the character disclosed, comprising flat grids of spaced substantially parallel lines in vernier relation and superposed to create by partial obscuration a plurality of substantially parallel shadow lines and said grids being pivotally related to cause said substantially parallel shadow lines to swing through a wide angle about the pivotal center with relatively small actual relative angular movement of the grids.

17. A compass comprising a case having a lubber-line, a rotatably adjustable cover having a scale registering with said lubber-line, a compass card rotatably operable in said case in association with said lubber-line and grids of spaced substantially parallel lines in vernier relation carried by said adjustable cover and pivotally mounted compass card respectively, said compass card carrying a complete compass rose and said first mentioned scale having degree markings to register with the scale of said compass rose.

18. A directional instrument, comprising a rotatable reference element, a grid carried by said element and angularly adjustable in respect to the axis of rotatable mounting of said element and a relatively stationary grid in vernier relation to said angularly adjustable rotatably carried grid.

19. A direction instrument, comprising a rotatable reference element, a grid of substantially parallel lines carried by said element and angularly adjustable about the axis of rotatable mounting of said element to different angular relations on said reference element, a relatively stationary grid of substantially parallel lines superposed in vernier relation to said first angularly adjustable rotatably carried grid and means for enabling the setting of said second grid in different angular positions in respect to said first grid.

20. A compass, comprising a case, a cover angularly adjustable thereon, a compass rose pivoted in said case, a substantially parallel lined grid carried by said compass rose, a substantially parallel lined grid carried by the cover and in vernier relation to said first grid, a lubber-line on the case and a scale on the cover registerable with said lubber-line to facilitate course indicating setting of said grid carrying cover.

WALTER P. POWERS.